(No Model.)
D. F. WEGNER.
BROADCAST SOWER, LAND ROLLER, AND DOUBLE REVOLVING HARROW.
No. 314,765. Patented Mar. 31, 1885.
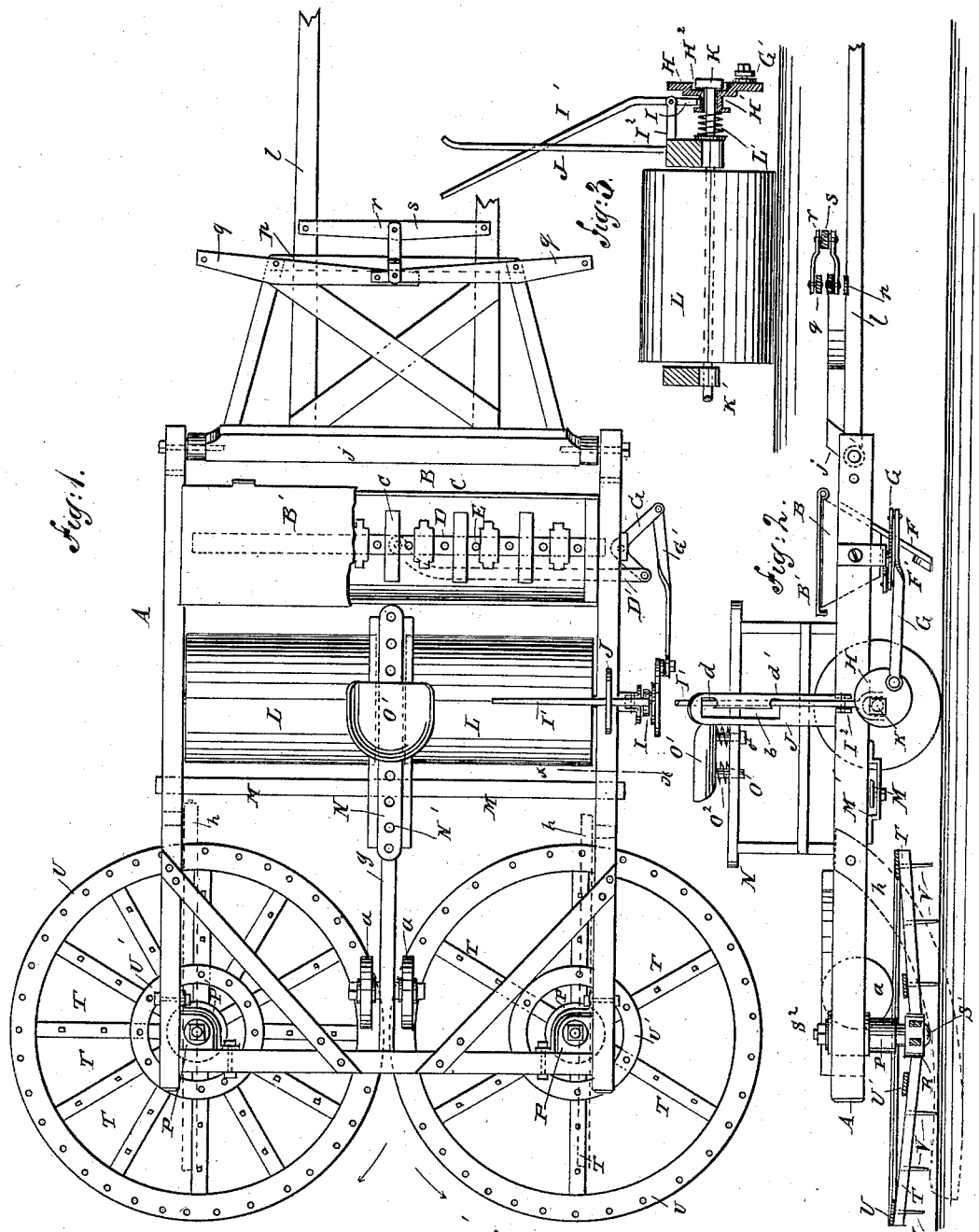
WITNESSES:
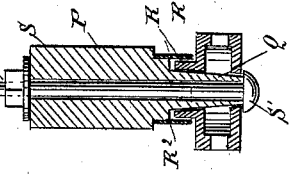
INVENTOR:
D. F. Wegner
BY Munn & Co.
ATTORNEYS.

UNITED STATES PATENT OFFICE.

DETLEF F. WEGNER, OF VALLEY CITY, DAKOTA TERRITORY.

BROADCAST-SOWER, LAND-ROLLER, AND DOUBLE REVOLVING HARROW.

SPECIFICATION forming part of Letters Patent No. 314,765, dated March 31, 1885.

Application filed May 5, 1884. (No model.)

*To all whom it may concern:*

Be it known that I, DETLEF F. WEGNER, of Valley City, in the county of Barnes and Territory of Dakota, have invented a new and Improved Broadcast-Sower, Land-Roller, and Double Revolving Harrow, of which the following is a full, clear, and exact description.

The object of my invention is to provide a new and improved machine for sowing seeds, rolling the land after the seeds have been sowed, and then harrowing it, all in one operation.

The invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a plan view of my improved combined broadcast-sower, land-roller, and double revolving harrow, parts being broken out. Fig. 2 is a longitudinal elevation of the same, parts being broken out and others shown in section. Fig. 3 is a cross-sectional view on the line $x$ $x$, Fig. 1. Fig. 4 is an enlarged cross-sectional view showing the manner of pivoting the harrow-wheels.

In the front of a frame, A, a transverse seed box or trough, B, provided with a cover, B', is held, which seed-box is V-shaped in cross-section, and is provided with a series of transverse partitions, C. In the bottom of the trough a series of apertures are formed, and over the apertured bottom a sliding flat bar, D, is held, which is provided with a series of apertures, E. Below the front inclined side of the trough B a board, F, is held, which is inclined downward from the front to the rear parallel with the front side of the trough, to form a guide for the seed that drops from the bottom of the trough. Triangular blocks F' are secured to the inner surface of the said guide-board, which blocks guide the seeds so that they will be sowed in regular rows. The sliding bar D is connected by a connecting-rod, D', with an elbow-lever, G, pivoted to the side of the frame, and connected by a connecting-rod, G', with a clutch-disk, H, which clutch-disk is provided with an annularly-grooved collar, H', for receiving the prongs of a fork, I, formed on the lower end of a lever, I', pivoted in arms I², projecting from the side of the frame. The lever I is bent and passes through a vertical slot, $b$, in a standard, J, on the frame, which slot is provided at its top and bottom ends with laterally-projecting notches $d$ and $d'$. The clutch-disk H is provided in its outer surface with a squared or other angular recess, H², for receiving the squared or other angular head, K, formed on the end of a shaft, K', on which one or two land-rollers are rigidly mounted, the said land-rollers and the shaft K' being parallel with the trough B and arranged behind the same within the frame A. The shaft K' passes through the collar H' of the disk H, and between the inner end of the collar and the side bar of the frame A a spiral spring, L', is arranged, which presses the collar outward and thus holds the head K on the end of the shaft K' within the recess H² in the outer surface of the clutch-disk H. The recess H² is preferably made eccentrically in the clutch-disk H. Behind the rollers a scraper-bar, M, is held parallel with the said rollers in clips M'. The scraper-bar can be adjusted a greater or less distance from the roller. On the frame a horizontal bar, N, is held at the middle of and above the same, which bar extends in the direction of the length of the frame, and is provided with a series of apertures, N', and through two of the said apertures pintles O are passed, which project downward from the seat O'. Spiral springs O² are wound around the said pintles between the top of the bar N and the under side of the seat O'. The seat can thus be adjusted a greater or less distance from the front of the frame. A nut, $o$, is screwed on the lower end of the front pintle O. In each rear corner of the frame a vertical block, P, is held securely to the frame by bands P', passed around the said blocks and securely bolted to the side bars and rear bars of the frame. The lower end of each block P is decreased in diameter and tapered to form a tapered neck, Q, to adapt it to pass into a horizontal hub, R, which is provided in its upper surface with an annular projection, R', which passes under a ring, R², held on the block P. A bolt, S, having a heavy head, S', on its lower end, is passed through the block from the bottom to the top, and a nut, S², is screwed on the upper end of the bolt. The hub R rests and revolves on the head S' of the bolt. From the hub R a series of spokes, T, project radially, which are united at their outer ends by a flat ring, U. The spokes are also united near their inner ends by a smaller flat ring, U'. From the rings U and U', and from the spokes T, a series of pins or spikes, V, project downward. Anti-friction rollers $a$ are pivoted to opposite sides of the middle longitudinal bar, $g$, of the frame, which rollers rest on the upper surface of the ring U. The spokes T of the wheels are inclined outward and upward, so that the rims of the wheels will be higher than their centers. In case the wheels are not to be used, runners $h$ are secured to the side bars of the frame at the rear end, as shown in dotted lines in Fig. 2. A cross-bar, $j$, is pivoted between the front ends of the side beams of the frame, and from the said cross-bar two poles, $l$, project toward the front, which poles are united by a cross-bar, $p$, on each end of which a double-tree, $q$, is pivoted, the inner ends of the said double-trees $q$ being pivoted to each other by a shackle, $r$, in which a single-tree is pivoted between the poles $l$. A single-tree is to be pivoted to the outer end of each double-tree $q$, so that three horses can be hitched to the machine, or, if desired, one horse can be used.

The operation is as follows: The machine is pulled along, the rollers L revolve, and the clutch-disk H is revolved with them, and by means of the connecting-rod G' the angle-lever G and the connecting-bar D' reciprocate the sliding apertured bar D in the bottom of the seed-trough B, thus permitting the seed to drop through the apertures in the bottom of the trough. The seeds are pressed into the ground by the rollers L, and the ground is then thoroughly harrowed, and the seeds covered by the two revolving wheels or pulverizers at the rear end of the frame. The rollers $a$ press the rims of the harrow-wheels downward at the middle longitudinal bar, $g$, of the frame, thus causing the wheels to revolve outward, as indicated by the arrows. If the seed-sower is not to be used, the upper end of the lever I is drawn inward to disengage it from the notch $d'$, and when the upper end of the lever I is pressed outward it is passed into the notch $d$. Thereby the spring L' is compressed, the clutch-disk H is disengaged from the head K on the shaft K', and then the rollers L revolve without revolving the clutch-disk H, and without reciprocating the bar D, as shown in Fig. 1. The harrow-wheels can be provided with more or less spokes. The frame A and the rear ends of the poles $l$ are suitably braced, as shown.

Having thus described my invention, what I claim as new, and desire to secure by Letters Patent, is—

1. The combination, with a frame, of a seed-sower held transversely in front of the same, a roller behind the said seed-sower, a reciprocating bar in the bottom of the seed-sower, a clutch-disk mounted loosely on the end of the shaft of the roller and connected by suitable bars and levers with the reciprocating bar on the bottom of the seed-sower, and means for engaging and disengaging the clutch-disk from the shaft of the roller, substantially as herein shown and described.

2. The combination, with a frame, of a seed-sower held transversely in front of the same, a roller behind the seed-sower, the shaft K', having a head, K, the disk H, mounted loosely on the shaft K', and provided with a square recess, H², in its outer surface, the spring L', for pressing the disk outward, a pivoted lever for moving the disk H, a reciprocating bar in the bottom of the seed-trough, and means for connecting the said bar with the disk H, substantially as herein shown and described.

3. The combination, with a frame, of a seed-sower held transversely in the front of the same, a roller held behind the seed-sower, a reciprocating bar in the seed-sower, a clutch held loosely on the shaft of the roller and connected with the reciprocating bar in the sower, the lever I', holding the clutch, and the vertical standard J, having the slot $b$, provided with top and bottom notches, $d$ $d'$, through which slot the lever I passes, substantially as herein shown and described.

4. The combination, with a frame, of two horizontal revolving wheels pivoted on the same, the said wheels having their spokes inclined upward from the hubs toward the rims, and the rims and spokes being provided with downwardly-projecting spikes or pins, substantially as herein shown and described.

5. The combination, with the hub R, having the annular projection R', of the blocks P, having the tapering necks Q, the ring R², on the said blocks, and the bolt S, provided with the head S', substantially as herein shown and described.

6. The combination, with the frame A, and the blocks P, provided with tapering necks Q and the rings R², of the hubs R', provided with the heads S', the spokes T, secured in the hubs and united by rims U U', the said spokes and rims being provided with teeth, substantially as herein shown and described.

DETLEF F. WEGNER.

Witnesses:
LEVI C. STUEWIG,
HERMAN WILLBER.